United States Patent [19]
Roos

[11] Patent Number: 5,305,325
[45] Date of Patent: Apr. 19, 1994

[54] METHOD AND A DEVICE FOR SUPERVISING AND TESTING MAJORITY VOTING

[75] Inventor: Sture G. Roos, Bergshamra, Sweden

[73] Assignee: Telefonaktiebolaget L M Ericsson, Stockholm, Sweden

[21] Appl. No.: 719,000

[22] Filed: Jun. 21, 1991

[30] Foreign Application Priority Data

Jul. 10, 1990 [SE] Sweden .............................. 9002407-6

[51] Int. Cl.⁵ ............................................. G06F 11/08
[52] U.S. Cl. ............................................. 371/3; 371/36
[58] Field of Search ................... 371/3, 27, 36, 68.1, 371/68.2

[56] References Cited

U.S. PATENT DOCUMENTS

| | | | |
|---|---|---|---|
| 4,484,330 | 11/1984 | Moy | 371/36 |
| 4,817,094 | 3/1989 | Lebizay et al. | 371/36 |
| 5,128,994 | 7/1992 | Flaherty et al. | 371/36 |

*Primary Examiner*—Vincent P. Canney
*Attorney, Agent, or Firm*—Burns, Doane, Swecker & Mathis

[57] ABSTRACT

The invention relates to a method and a device for testing and supervising majority votes in a multiplane digital time selector with essentially identical equipment in each of at least three planes (A,B,C) working in parallel. An incoming data flow is distributed to the planes and is allowed to pass through the equipment in each of them and gives rise to outgoing data streams. These outgoing data streams are compared to each other and a majority voted outgoing data flow based upon the comparison is delivered from the unit. An error is periodically introduced in accordance with a predetermined pattern in the three planes and the data streams arriving at the majority vote and the majority voted data flow are compared. If an error is then found in any of the data streams an alarm is emitted. If an alarm (LARM1) is expected that has been caused by an error introduced in accordance with the predetermined pattern, this alarm is identified based upon knowledge of the predetermined pattern in order to distinguish from alarms, which result from errors not introduced in accordance with the pattern.

8 Claims, 1 Drawing Sheet

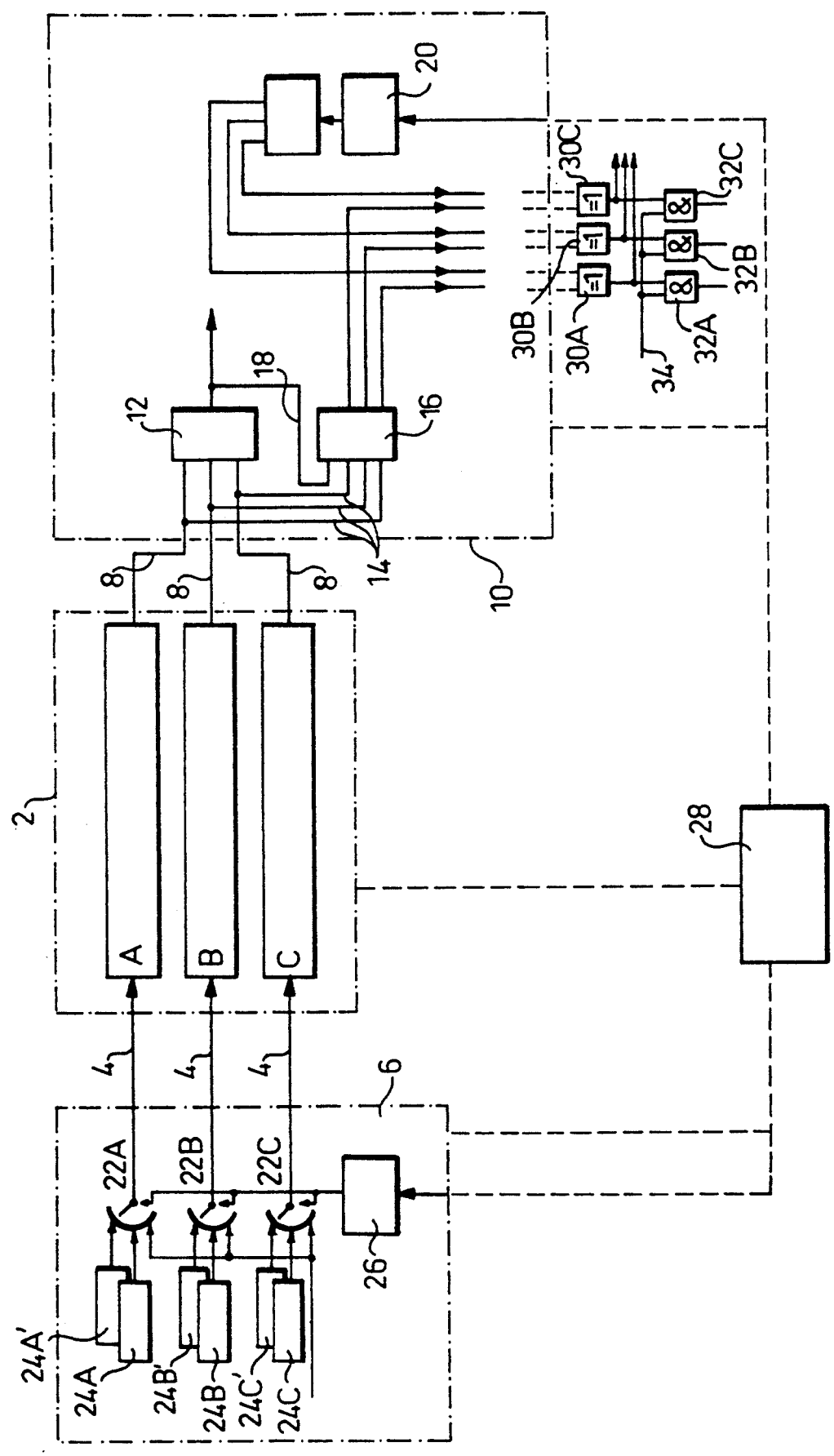

METHOD AND A DEVICE FOR SUPERVISING AND TESTING MAJORITY VOTING

TECHNICAL AREA

The present invention relates to a method and a device for testing and supervising majority votes in a multiplane unit in a digital time selector, said unit including essentially identical equipment in each of at least three planes, or paths, working in parallel.

The method comprises distributing to the parallel planes a data flow received by the unit, allowing said data flow to pass the equipment in each of the planes, delivering an outgoing data stream from the respective planes, comparing said outgoing data streams to each other, and delivering from the unit a majority voted outgoing data flow based upon the comparison, testing and supervising said majority vote by introducing an error deliberately into the data streams to be majority voted, comparing these data streams with the majority voted data flow, and emitting an alarm as a result of this comparison if an error is found in any of data streams coming to the majority vote.

The device comprises means for distributing to the parallel planes a data flow received by said unit, means for passing said data flow through the equipment in each plane, means for delivering an outgoing data stream on an outgoing line from the respective planes, said lines being connected to an input each of a majority vote circuit including means for comparing these outgoing data streams to each other, means for delivering from the unit a majority voted outgoing dataflow based upon the comparison, a comparison and supervision circuit having inputs connected to each of the outgoing lines from the multiplane unit and to a line from the output of the majority vote circuit, respectively, and means for deliberately introducing an error into the data streams received by the majority vote circuit from the multiplane unit, said comparison circuit having means for testing and supervising the majority vote by comparing the received data streams with the majority voted data flow, and means for emitting an alarm if an error is found in any of said data streams.

State of the Art

For obtaining high reliability in selector networks it is well known to use three parallel planes including identical equipment in function units included in the network selectors, whereby an incoming data flow to the unit is distributed to the parallel planes, is allowed to pass the equipment in each of them, and an outgoing data signal is emitted from the respective planes. These outgoing data signals are compared to each other, and a majority voted outgoing data flow based upon the comparison is delivered from the unit. A time selector working in accordance with these principles is described, for example, in the Swedish patent applications SE 8705065-4 and SE 8902192-7.

The purpose of supervising and testing a majority vote is to secure, in the case of an error in a selector plane, that no errors are propagated to the output of the majority vote. The testing must be carried through in such a way that the test does not affect the outgoing data at the same time as these data are tested in supervision circuits by being compared with the data streams to the majority vote, which possibly results in an alarm.

For obtaining a perfect supervision it is known to introduce, for error control of the outgoing data flow, an error into the data streams to the majority vote. Such errors can be introduced by the aid of routine tests controlled by a processor or similar. Of course, equipment using majority votes demands that the bit flows reaching the majority vote should be mutually synchronous. One of the problems with routine tests is that an introduced error can give rise to numerous alarms in different places in e.g. a selector network. This gives rise to a burst of alarms which must be received and analysed in a central point.

DESCRIPTION OF THE INVENTION

The object of the invention is to eliminate the above mentioned problems and make possible the performing of routine tests of majority votes and associated supervising circuits without affecting data and in such a way that propagation of errors is avoided.

According to the invention the method's step of deliberately introducing an error comprises cyclically introducing the error into the planes in accordance with a predetermined pattern, and the method includes identifying an expected alarm, caused by an error introduced in accordance with the predetermined pattern, based upon knowledge of the predetermined pattern in order to distinguish from alarms resulting from errors not introduced in accordance with the pattern.

Further according to the invention the device's means for deliberately introducing an error includes means for cyclically introducing the error into the planes of the multiplane unit in accordance with a predetermined pattern, and the device further includes means for identifying an expected alarm, which has been caused by an error introduced in accordance with the predetermined pattern, based upon knowledge of the predetermined pattern in order to distinguish from alarms, which result from errors not introduced in accordance with the pattern.

By means of the invention it is also tested that synchronism exists between the bit streams of the different planes and between these and the bit stream of the receiving unit, i.e. the counter or similar device that contains the time reference of the receiving unit, e.g. a time slot counter/bit counter in a digital selector network.

BRIEF DESCRIPTION OF THE DRAWING

The invention shall now be described more closely with reference to an embodiment schematically illustrated on the attached drawing that shows a block diagram of a time selector.

PREFERRED EMBODIMENT

On the drawing a multiplane, or multipath, unit included in a digital time selector is generally designated 2 and comprises essentially identical equipment in each of three selector planes A, B and C, respectively, working in parallel. The unit 2 is connected for receiving a data flow on lines 4 from a sending unit 6, said data flow being distributed to the parallel planes, and allowed to pass the equipment in each of these. An outgoing data signal is emitted from each of the planes A, B and C, respectively, on data lines 8 to a receiving unit 10. In the receiving unit 10 the data lines 8 are connected to an input each of a majority vote circuit 12, and in parallel therewith, via data lines 14, to an input each of a supervision/comparison circuit 16. The output of the majority vote circuit 12, on which a conventionally majority voted data signal is obtained, is connected to a further input of the circuit 16 via a data line 18.

In the comparison circuit 16 the majority vote is tested by comparing the data signals from the planes A, B, C with the majority voted output signal from the majority vote circuit 12. If the comparison indicates an error in any or some of the three data signals on the lines 8 an alarm signal LARM1A, LARM1B and LARM1C, respectively, is emitted on a corresponding one of three outputs of the comparison circuit 16. The alarms LARM1A, LARM1B, LARM1C thus indicate errors in any or some of the planes A, B and C, respectively. Functional errors in the majority vote circuit 12 are indicated by the fact that the alarm signal is emitted on at least two of the outputs of the comparison circuits 16.

In the receiving unit 10 there is also a counter 20 working synchronously with the selector. The bit streams coming to the majority vote circuit 12 run synchronously and have a frame structure which is known and defined. Within the frame there is e.g. a frame locking word for synchronizing the counter 20 on bit/frame and multiframe level in the receiving unit 10. One bit or a number of bits in the frame are used for testing the majority vote. These bits can form part of the synchronizing word and are normally equal in the three planes. The technique of using multiframe structure with frame locking words is known per se, and can e.g. be performed in accordance with the European so called CCITT-specification, where the sections G 703 and G 707 are directed to PCM-systems. For further illustration or description reference is made to said sections.

In accordance with the invention the test includes that errors are cyclically introduced in accordance with a predetermined pattern in the selector planes A, B and C. More particularly, this can be carried through by distributing the incoming data stream DATAin to the three planes via data selectors 22A, 22B and 22C, respectively, included in the unit 6. Besides an input for the bit stream DATAin each such data selector 22 has at least one further input connected to a corresponding bit producer 24 capable of emitting a characteristic bit sequence. In the drawing two such bit producers are shown as examples for each data selector 22, said bit producers being capable of emitting its particular characteristic bit sequence, namely 24A and 24A', 24B and 24B', and 24C and 24C', respectively. The data selectors 22A, 22B and 22C, respectively, are controlled by a counter 26 working synchronously with the selector in the same way as the counter 20. Controlled by the counter 26 and in accordance with the predetermined pattern the bit producers 24, instead of the data stream DATAin, are cyclically connected by the data selectors 22 to the selector planes A, B or C. Connection of a bit producer 24 to the corresponding selector plane implies that this selector plane on its input receives the characteristic bit sequence of this bit producer, said characteristic bit sequence normally differing from the bit sequence DATAin, and thus having the character of an error introduced in the plane in question.

Synchronization of the counters 20 and 26 with each other and with the rest of the selector, primarily the three planes and the multiframe structure, can be carried through in a way easily perceived by a person or ordinary skill in the art. In the drawing this is indicated by means of a clock module block 28 and dashed lines leading from the block 28 to the counters 20 and 26, and the units 2, 6, and 10.

A number of different patterns for the cyclic introduction of errors into the selector planes A, B and C is perceivable. As an example the following cyclically repeated pattern may be stated: No error, error in plane A, error in plane B, error in plane C.

Since the test is continuous no routine test controlled by a supreme processor level is needed.

The majority vote can be tested both with "1":s and "0":s. Since the receiving unit 10 knows the pattern it also knows when alarm will come from the supervising circuit. With the aid of decoding on its outputs the counter 20 then produces a further alarm signal LARM2A, LARM2B and LARM2C, respectively, when an error is expected from the plane comparison in the comparison circuit 16. During the cyclically repeated test alarms will thereby be produced in pairs, as is illustrated on the drawing. In case of errors in the counter, the synchronization, the comparison circuit or the majority vote, alarms do not appear in pairs, this then indicating a "real" error.

The pair of alarms LARM1, LARM2 can be blocked on an arbitrary level in the system so as to prevent alarm bursts introduced by the test. More particularly, and as an example, very schematically shown in the drawing, the respective pairs of lines, on which these pairs of alarms LARM1-2A, LARM1-2B and LARM1-2C appear, can form the inputs to each its EXCLUSIVE-OR-gate 30A, 30B and 30C, respectively. The outputs of the EXCLUSIVE-OR-gates 30 are connected to each its input of corresponding AND-gates 32A, 32B and 32C, the respective second inputs of which having a common input line 34 from a supreme processor, not shown. On the output of each EXCLUSIVE-OR-gate then a "1" appears at the presence of LARM1 on one of its inputs in absence of LARM2 on its other input, which thus corresponds to the presence of a "real" error being indicated and alarmed. A "0" on the line 34 prevents forwarding of this "1".

I claim:

1. A method for testing and supervising majority votes in a multiplane unit in a digital time selector, said unit including essentially identical equipment in each of at least three planes working in parallel, said method comprising distributing to the parallel planes a data flow received by the unit, allowing said data flow to pass the equipment in each of the planes, delivering an outgoing data stream from the respective planes, comparing said outgoing data streams to each other, and delivering from the unit a majority voted outgoing dataflow based upon the comparison, testing and supervising said majority vote by introducing an error deliberately into the data streams to be majority voted, comparing these data streams with the majority voted data flow, and emitting an alarm as a result of this comparison if an error is found in any of data streams coming to the majority vote, wherein the step of deliberately introducing an error comprises cyclically introducing the error into the planes in accordance with a predetermined pattern, and by identifying an expected alarm, caused by an error introduced in accordance with the predetermined pattern, based upon knowledge of the predetermined pattern in order to distinguish from alarms resulting from errors not introduced in accordance with the pattern.

2. A method according to claim 1, wherein said identification step comprises emitting a further alarm simultaneously with the expected alarm so as to produced the alarms obtained by the cyclical tests in pairs.

3. A method according to claim 2, further comprising the step blocking the pair of alarms so as to prevent alarm bursts introduced by the test.

4. A method in accordance with claim 1, wherein the step of deliverately introducing an error further comprises introducing the deliverate error into one plane of the multiplane unit at a time.

5. A device for testing and supervising majority votes in a multiplane unit in a digital time selector, said unit including essentially identical equipment in each of at least three planes (A,B,C) working in parallel, means for distributing to the parallel planes a dataflow received by said unit, comprising:
- means for passing said data flow through the equipment in each panel;
- means for delivering an outgoing data streams on an outgoing line from the respective planes, said lines each being connected to an input of a majority vote circuit including means for comparing these outgoing data streams to each other;
- means for delivering from the unit a majority voted outgoing dataflow based upon the comparison;
- a comparison and supervision circuit having inputs connected to each of the outgoing lines from the multiplane unit and to a line from the output of the majority vote circuit, respectively, and having means for testing and supervising the majority vote by comparing the received data streams with the majority voted data flow;
- means for deliberately introducing an error into the data streams received by the majority vote circuit from the multiplane unit, including means for cyclically introducing the error into the planes of the multiplane unit in accordance with a predetermined pattern; and
- means for emitting an alarm if an error is found in any of said data streams;
- means for identifying an expected alarm, which has been caused by an error introduced in accordance with the predetermined pattern, based upon knowledge of the predetermined pattern, in order to distinguish which results from errors not introduced in accordance with the pattern.

6. A device according to claim 5, further comprising means for emitting, for enabling said identification, a further alarm simultaneously with the expected alarm so as to produce the alarms obtained by the cyclical tests in pairs.

7. A device according to claim 6, further comprising means for blocking the pairs of alarms so as to prevent alarm bursts introduced by the tests.

8. A device in accordance with claim 5 wherein said means for deliberately introducing an error cyclically according to a predetermined pattern introduces said error in one plane at a time.

* * * * *